United States Patent
van Campen et al.

(10) Patent No.: US 10,241,881 B2
(45) Date of Patent: Mar. 26, 2019

(54) ENERGY SERVICES RECOMMENDATION ENGINE

(71) Applicant: SCHNEIDER ELECTRIC USA, INC., Palatine (IL)

(72) Inventors: Jacques Roland van Campen, Saanichton (CA); Daniel J. Wall, Saanichton (CA); Paul James Tindale, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/579,475

(22) Filed: Dec. 22, 2014

(65) Prior Publication Data

US 2016/0179159 A1 Jun. 23, 2016

(51) Int. Cl.
| | | |
|---|---|---|
| *G06F 11/30* | (2006.01) | |
| *G06Q 50/06* | (2012.01) | |
| *G06Q 30/02* | (2012.01) | |
| *F24F 11/46* | (2018.01) | |

(52) U.S. Cl.
CPC ...... *G06F 11/3024* (2013.01); *G06F 11/3055* (2013.01); *G06Q 30/02* (2013.01); *G06Q 50/06* (2013.01); *F24F 11/46* (2018.01); *Y04S 50/00* (2013.01)

(58) Field of Classification Search
CPC ........................................................ G06F 1/28
USPC ........................................................ 713/320
See application file for complete search history.

(56) References Cited

U.S. PATENT DOCUMENTS

| | | | |
|---|---|---|---|
| 5,963,650 A | 10/1999 | Simionescu et al. | |
| 2010/0324962 A1 | 12/2010 | Nesler et al. | |
| 2011/0061015 A1* | 3/2011 | Drees ................. | G05B 15/02 715/771 |
| 2011/0160913 A1* | 6/2011 | Parker ................. | F24D 19/1048 700/276 |
| 2011/0178977 A1* | 7/2011 | Drees ................. | G05B 15/02 706/52 |
| 2014/0114613 A1* | 4/2014 | Wang ................. | G05B 23/0205 702/185 |
| 2014/0180968 A1* | 6/2014 | Song ................. | G01D 4/002 705/412 |
| 2015/0135013 A1* | 5/2015 | Thomas ............. | G06F 11/2294 714/27 |

OTHER PUBLICATIONS

International Search Report and Written Opinion from corresponding International Application No. PCT/US2015/067109 dated Mar. 3, 2016.
Ahmed Zoha et al: "Non-Intrusive Load Monitoring Approaches for Disaggregated Energy Sensing: A Survey", Sensors, vol . 12, No. 12, Dec. 6, 2012 (Dec. 6, 2012), pp. 16838-16866, XP055109922, ISSN: 1424-8220, DOI: 10.3390/s121216838 the whole document.
Extended European Search Report from corresponding European Application No. 15874250.2 dated Jun. 6, 2018.

* cited by examiner

*Primary Examiner* — Jaweed A Abbaszadeh
*Assistant Examiner* — Sumil M Desai
(74) *Attorney, Agent, or Firm* — Lando & Anastasi, LLP

(57) ABSTRACT

A combination of one or more monitoring devices and a central processor at a hosted service gathers data from a customer site, identifies energy system events of interest, and analyzes the energy system event of interest to determine and recommend or implement vendor services designed to increase energy savings and/or energy system reliability.

22 Claims, 7 Drawing Sheets

ENERGY SERVICES RECOMMENDATION ENGINE

BACKGROUND

1. Field of Invention

Aspects and embodiments of the present disclosure are directed to systems and methods for providing energy management services to customers.

2. Discussion of Related Art

Existing energy consumption monitoring devices can gather an impressive amount of measurement data for energy equipment and systems, but turning this data into increased energy savings and/or equipment reliability requires expertise rarely found in one individual at a typical facility. Some vendors offer a central monitoring service and employ energy analysts to carefully review data to spot possible opportunities, but this approach is labor intensive and hard to scale.

SUMMARY

In accordance with an aspect of the present disclosure, there is provided a system comprising a central processing unit configured to receive data regarding parameters of power delivered to a device from a monitor operating in accordance with a first mode of operation, instruct the monitor to change from operating in accordance with the first mode of operation to operating in accordance with a second mode of operation, receive additional data regarding parameters of power delivered to the device from the monitor operating in accordance with the second mode of operation, analyze the data regarding the parameters of power and the additional data to make a determination as to whether the device is performing in accordance with a predefined acceptable manner, and provide an indication that the device is not performing in accordance with the predefined acceptable manner responsive to making a determination that the device is not performing in accordance with the predefined acceptable manner.

In some embodiments, the central processing unit is further configured to receive metadata related to the device and to analyze the metadata in addition to the data regarding the parameters of power to make the determination. The metadata may include an indication of a type of the device. The metadata may include data regarding weather conditions at a location of the device.

In some embodiments, the central processing unit is further configured to communicate the determination to a representative of a facility in which the device is located.

In some embodiments, the central processing unit is further configured to determine an action to take to bring the device into a condition in which it performs in accordance with the predefined acceptable manner. The central processing unit may be further configured to send a control signal causing the action to be implemented. The central processing unit may be further configured to communicate an indication of the action to a representative of a facility in which the device is located.

In some embodiments, the system further comprises a portable electronic device configured to download, at a facility in which the monitor is located, the data regarding the parameters of power delivered to the device from a memory of the monitor and to transmit the data to the central processing unit.

In some embodiments, the central processing unit is further configured to request and receive data from a plurality of monitors at a facility, to analyze the data from the plurality of monitors, and to create a report including an overall energy health index of the facility.

In some embodiments, the central processing unit is further configured to communicate programming for implementing the second mode of operation to the monitor.

In some embodiments, the central processing unit is further configured to instruct the monitor to provide follow-up data obtained from the device utilizing a third mode of operation responsive to receiving an indication that a problem with the device has been addressed.

In some embodiments, the central processing unit is further configured to provide an indication to a representative of an energy service organization to place a service call to a representative of a facility in which the device is located responsive to making a determination that the device is not performing in accordance with the predefined acceptable manner.

In accordance with another aspect of the present disclosure, there is provided a method comprising receiving, at a centralized computer system, data regarding a first parameter of power provided to a device from a monitor configured to monitor the parameter of power provided to the device and operating in accordance with a first monitoring mode, instructing the monitor to change from operating in accordance with the first monitoring mode to operating in accordance with a second monitoring mode, receiving, at the centralized computer system, data regarding a second parameter of power delivered to the device from the monitor operating in accordance with the second monitoring mode, analyzing the data regarding the first and second parameters of power to make a determination as to whether the device is performing in accordance with a predefined acceptable manner, and providing an indication that the device is not performing in accordance with the predefined acceptable manner responsive to making a determination that the device is not performing in accordance with the predefined acceptable manner.

In some embodiments, the method further comprises receiving, at the centralized computer system, metadata related to the device and analyzing the metadata in addition to the data regarding the parameters of power to make the determination.

In some embodiments, the method further comprises automatically communicating the determination to a representative of a facility in which the device is located.

In some embodiments, the method further comprises determining an action to take to bring the device into a condition in which it performs in accordance with the predefined acceptable manner. The method may further comprise automatically communicating an indication of the action to a representative of a facility in which the device is located.

In some embodiments, the method further comprises downloading the data regarding the parameters of power delivered to the device from a memory of the monitor with a portable electronic device and transmitting the data to the centralized computer system from the portable electronic device.

In some embodiments, the method further comprises communicating programming for implementing the second monitoring mode to the monitor from the centralized computer system.

In some embodiments, the method further comprises instructing the monitor to provide follow-up data obtained from the device to the centralized computer system utilizing a third monitoring mode responsive to receiving an indication that a problem with the device has been addressed.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
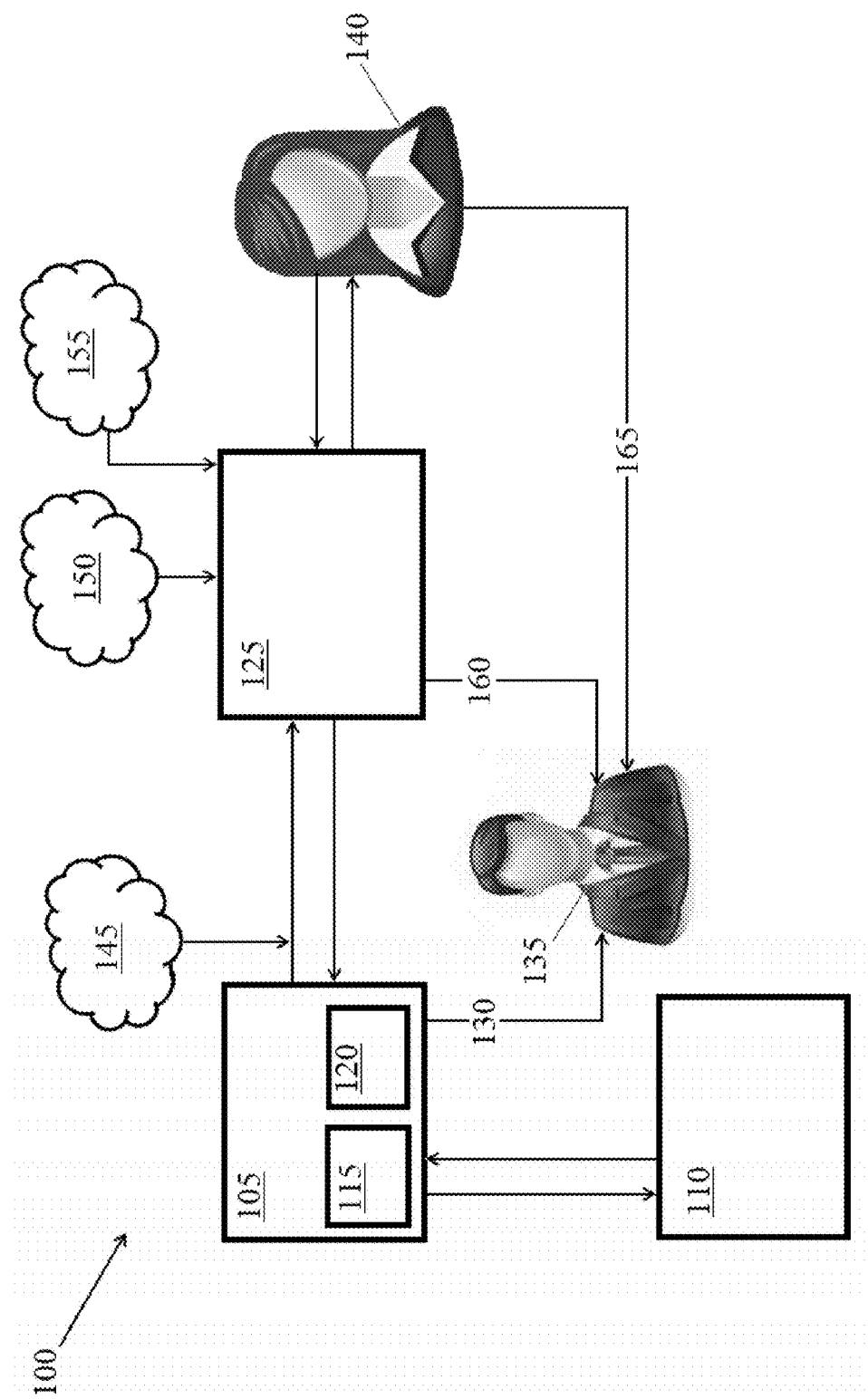
FIG. 1 is a schematic of an embodiment of a system including an energy services recommendation engine.

This disclosure is not limited in its application to the details of construction and the arrangement of components set forth in the following description or illustrated in the drawings. The disclosed systems and methods are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Various aspects and embodiments disclosed herein include systems and methods for providing energy management services to customers. Aspects and embodiments disclosed herein include a combination of one or more monitoring devices and a central processor at a hosted service configured to gather data from a customer site, identify energy system events of interest, and analyze the energy system events of interest to determine and recommend and/or implement vendor services designed to increase energy savings and/or energy system reliability. Aspects and embodiments disclosed herein include an energy services recommendation system that combines monitoring devices and a hosted data analysis processor to automatically identify possible energy services of value to a customer.

Aspects and embodiments of an energy service monitor and recommendation system include one or more energy system monitoring devices. The energy system monitoring devices are configured to measure a variety of energy system parameters of a customer's system and analyze the collected measurement data to highlight energy system events of interest—those events that represent opportunities to increase energy system savings and/or reliability. At least some embodiments provide control signals to devices of the energy system or coupled to the energy system to provide increased savings and/or reliability.

The energy services recommendation system includes a central processor in communication with the monitoring devices. The central processor receives data representing energy system events of interest from one or more of the energy system monitoring devices and further processes the data to explore the opportunities available to provide further energy savings and/or increased reliability. In some embodiments, the analysis provided by the central processor may be offered as a hosted service by a vendor. In accordance with some embodiments, a service is offered by a vendor to address the potential opportunity discovered by the combination of one or more of the energy system monitoring devices and the central processor. Examples of such services include an energy performance contract, an energy audit to further quantify energy conservation measures and associated energy savings, ongoing preemptive maintenance, and optimization commissioning of existing energy system configurations.

In some embodiments, individual monitoring devices include functionality to identifying potential energy system events of interest. The functionality of the individual monitoring devices to identifying potential energy system events of interest may or may not be accessible or modifiable through a customer-visible interface. A customer may opt-in to allow the monitoring devices to communicate with the central processor and receive service offers from a vendor. The monitoring devices apply the functionality to identify events of interest, and transmit relevant data to the central processor. Such relevant data may include metadata that helps add context to the captured events of interest, for example, site geographical location, type of equipment monitored, and/or customer industry. In some embodiments, specific functionality operates on the measured data to automatically determine this metadata, for example, to determine if a monitor is being used to track a heating ventilation and air conditioning (HVAC) unit vs. a rack of computer servers.

In some embodiments, the central processor may apply sophisticated analysis to the data received from the monitoring devices to refine the list of recommended services that would be of value to the customer. The central processor may send requests for additional data from the monitors as part of this analysis, and/or may send instructions to implement new or additional functionality to the monitors in the form of programs for execution on the monitors. The central processor may acquire data from other sources to combine with the data received from the monitors as part of the analysis step, and may compare analysis results from one customer site with results generated for other similar customer sites to facilitate formulation of the best service recommendations.

The central processor may communicate the status of the electrical equipment or system being monitored as an overall health index, with this top-level index comprised of one or more sub-indices. Examples of sub-indices include a carbon emissions index, a power quality index, a power usage effectiveness (PUE) index, an energy cost index, and an HVAC efficiency index. Each sub-index may be calculated by a software module, and the overall health index software module may combine the output from the sub-index software modules to generate the overall health index value. These sub-index modules may interact with the overall health index software module using a plug-in architecture, allowing new sub-indices to be added by adding new software modules. One or more default suites of sub-index software modules may be bundled for different applications, for example, as a suite for commercial buildings with LEED certification. The particular suite of sub-index software modules used can also be customized to a customer's requirements.

The central processor may generate a list of recommended services for the customer to consider. This list may be sent automatically to a designated customer contact, or may be reviewed by a service vendor employee beforehand, with relevant recommendations finally being offered to the customer. If a customer accepts services that involve a monitoring component to quantify the savings and/or increased reliability realized over time, the central processor may send one or more associated programs to select monitors to track service performance over time.

In some embodiments of the monitoring system, the monitors may be connected directly to the central processor through a communication network, which may be, for example, a wired or wireless Ethernet network, a serial network, or the internet. In an alternate scenario, one or more monitors have no direct connection to the central processor, and a mobile device acts as a communication proxy to move data from the monitor(s) to the central processor and/or communicate information back from the central processor to the monitor(s).

In this alternate embodiment, a user with a mobile device collects data from a monitor and uses the mobile device to send the collected data to the central processor. When a monitor detects an event of interest, it may display a message on its screen to prompt the user to collect a data set from the monitor using a mobile device. This data may be collected using a native app designed for this purpose, or the monitor may offer the data in a fashion compatible with an app that already exists on many mobile devices, for example, by displaying a Quick Response Code (QR code) on its screen.

The data collected from the monitor is sent from the mobile device to the central processor for further analysis. This monitor data may be accompanied by additional metadata gathered from the mobile device, for example, GPS coordinates or further data entered by the user. As mentioned above, the central processor may then present one or more service recommendations to the user. If the central processor determines additional data is required, it may send a notification to the user, providing the user with instructions for retrieving the additional data from the monitor. If the monitor needs to be configured to generate this additional data, the central processor may provide the user with instructions of how to perform this configuration, including sending one or more programs to be transferred to the monitor.

An embodiment of an energy services recommendation engine system is illustrated schematically, generally at 100, in FIG. 1. The system 100 includes at least one metering device 105, hereinafter referred to as monitor 105. The monitor 105 is in communication with, or otherwise monitors a parameter of power delivered to or consumed by an energy consuming device or system 110, hereinafter device 110. For example, the monitor 105 may directly communicate with the device 110 or may monitor a parameter of power delivered to the device 110 from a junction box or power supply physically separate from the device 110. The monitor 105 may communicate with the device 110 by sending a request for information to device 110 in response to which device 110 sends the requested information to the monitor 105. In other embodiments, the monitor 105 may passively monitor a parameter of power delivered to the device 110.

The parameter of power may be any measurable parameter associated with power or energy provided to the device 110. For electrical devices or systems, the parameter of power may be, for example, any one or more of voltage, current, power quality, electrical impedance of the device or power supply wiring associated with the device, reflected power, a phase of power delivered or reflected from the device, power harmonics in power delivered to or reflected from the device, or any other parameter of power or energy known in the art. For systems other than electrical devices, for example, boilers, the parameter of power may be a quantity, flow rate, and/or temperature of fuel, for example, fuel oil or natural gas provided to the boiler. The parameter of power or energy may be an input parameter or an output parameter of the device 110. For example, for devices such as pumps, the parameter of power may be an input parameter such as a parameter of power delivered to the pump, and/or an output parameter such as a volume or flow of a fluid pumped by the pump. For utilities, the parameter of power or energy may be an amount of coal or other fuel, for example, water in the instance of a hydroelectric generator or an intensity of incident sunlight for a solar energy heater or photovoltaic cell delivered per unit time. Parameters of power or energy monitored by embodiments of the monitor 105 are not limited to any particular parameter of power or energy.

The device 110 may be a system at a location of a customer or consumer of power, for example, a HVAC system or a lighting system in an office building, a boiler or a heating system in a home or industrial location, a motor in a piece of industrial manufacturing equipment, or any other system or device which consumes energy. Embodiments disclosed herein will be explained with reference to an energy consuming device 110, however such embodiments may be equally applicable to the monitoring of parameters of power delivered from an energy producing device or system.

The monitor 105 may be configured to implement one or more operating modes or frameworks 115, 120 for performing a particular power parameter measurement scheme. The operating modes or frameworks 115, 120 may include instructions regarding a type or types of parameters to monitor, a frequency or sample rate for measurement of the parameter(s), and/or one or more actions to take responsive to one or more of the monitored parameters displaying a particular characteristic. The particular characteristic may be, for example, current delivered to a device 110 being outside a predetermined or calculated level or range determined to be acceptable or normal for the device 110 or timing or duration of the delivery of power at a certain level being different from expected. The particular characteristic of the parameter of power or energy delivered to or displayed by the device 110 will vary depending upon the type of device 110 and the type of power or energy delivered to or produced by the device 110.

One of the one or more actions the monitor may take responsive to one or more of the monitored parameters displaying a particular characteristic may be to provide a local warning or indication 130 of the particular characteristic being observed. The local warning 130 may alert a local user 135 to a potential problem with the device 110 being monitored. The local user 135 may respond by inspecting the device being monitored and performing repairs or maintenance if desired. In some embodiments, the monitor 105 may include functionality to adjust an operating parameter of the device 110 to bring the one or more of the monitored parameters to within a desirable range.

Another one of the one or more actions the monitor may take responsive to one or more of the monitored parameters of the monitored device 110 displaying a particular characteristic may be to initiate communication with a central processing unit 125. The communication may involve transmitting a representation of a parameter of power or energy of the device 110 measured by the monitor 105 to the central processing unit 125.

In some embodiments, the central processing unit 125 may analyze the representation of the parameter of power or energy of the device 110 measured by the monitor 105 to determine a potential root cause and/or an action to address the root cause, for example, a repair or adjustment to the device 110, to a mode of operation of the device 110, and/or repair or adjustment to equipment ancillary to the device 110.

In some embodiments, the central processor 125 may request assistance from an operator 140 in analyzing the representation of the parameter of power or energy of the device 110 measured by the monitor 105 or in determining an appropriate response. The operator 140 may interact with an interface of the central processor 125 to provide the results of the operator's analysis and/or to provide instructions for generating a response to the central processor 125.

In addition to data associated with the parameter of power or energy of the device 110 measured by the monitor 105, the central processor may be provided with other data to facilitate analysis of the data associated with the parameter and/or to facilitate determining an appropriate response. The additional data may include, for example, metadata 145. Metadata 145 may include data which provides context for the data associated with the parameter. Metadata 145 may include, for example, an indication of a type and/or a number of device(s) 110 being monitored at a particular facility or by a particular monitor 105, details regarding the operating mode or framework 115, 120 being utilized by the monitor 105 (sample rate, parameter(s) being monitored, etc.), information regarding the capabilities of the monitor 105 (e.g., measurement capability and/or sensitivity), a geographic location of the monitor 105, device 110 being monitored, and/or a facility in which the device 110 being monitored is located. Information regarding a type of facility in which the device 110 being monitored is located may include, for example, an indication of whether the facility is a residence, an office building, or a industrial facility, a type of business or industry associated with the facility, a size of the facility, types and quantities of equipment and/or monitored or unmonitored devices 110 in the facility, etc.

A particular set of metadata 145 may be associated with a particular monitor 105 and/or with a particular device 110 in the central processing unit 125. In other embodiments, the metadata 145 may be stored in the monitor 105 and sent to the central processing unit and/or appended to data associated with the parameter of power or energy of the device 110 measured by the monitor 105 and sent to the central processing unit by another device local to the facility including the monitor 105 and/or device 110.

Other data, for example, environmental data 150 such as data related to temperature and/or humidity or information regarding the presence or absence of storms or other environmental events in a location of the facility in which the device 110 being monitored is located may also be provided to the central processing unit 125 to facilitate analysis of the data associated with the parameter and/or to facilitate determining an appropriate response. The environmental data 150 may, in some embodiments, be provided along with data from the monitor 110, and in other embodiments, may be obtained from a separate system, for example, a weather reporting web site on the internet. In some embodiments, the central processing unit 125 may obtain geographic data regarding the location of the monitor 105, device 110 being monitored, and/or a facility in which the device 110 being monitored is located and utilize this geographic data to look up the environmental data 150, for example, over the internet or from a weather reporting service. The central processing device may associate the environmental data 150 with data regarding the parameter(s) of power or energy of the device 110 measured by the monitor 105 and sent to the central processing unit.

Further data 155 may be obtained by or provided to the central processor 125 to facilitate analysis of the data associated with the parameter(s) of power or energy of the device 110 measured by the monitor 105 provided to the central processing unit 125 and/or to facilitate determining an appropriate response to the receipt of the data associated with the parameter(s) of power or energy of the device 110. For example, the data 155 may include data associated with similar parameter(s) of power or energy of the device 110 measured by the monitor 105 provided to the central processing unit 125 that were measured in one or more different facilities which may be similar in terms of facility type, location, geography, production units present in the facility, etc., as the facility in which the device 110 and/or monitor 105 is located. The data 155 may be used by the central processor 125 to compare against the data associated with the parameter(s) of power or energy of the device 110 measured by the monitor 105 provided to the central processing unit 125 to facilitate analysis. For example, the data 155 may be used by the central processor 125 to help identify a root cause of the parameter(s) of power or energy of the device 110, to determine whether the parameter(s) of power or energy of the device 110 should be considered unusual or normal for the particular facility in which the device 110 is located, and/or what actions may have been most useful in the past to resolve any problems associated with the monitored parameter(s) of power or energy of the device 110.

In some embodiments, if the central processor 125 determines that the parameter(s) of power or energy of the device 110 measured by the monitor 105 provided to the central processing unit 125 are likely indicative of a problem associated with the device 110, the central processor may communicate an indication of this determination to the local user 135. In some embodiments, the central processor 125 may also communicate recommended actions to take to further investigate or to resolve the likely problem(s) with the device 110. In some embodiments, the central processor 125 may communicate instructions to a monitor 110 or other system at a facility to automatically implement an action or actions to resolve the likely problem(s) with the device 110. In some embodiments, communication between the central processing unit 125 and the local user 135 may occur automatically by, for example, generating and sending a report, e-mail, text message, or other form of communication to the local user 135 over a communication pathway 160, for example, the internet or a telephone line. In other embodiments, a service call 165 may be made between the operator 140, whom may be a trained service technician or a representative of a power services company, and the local user 135 to discuss the likely problem(s) with the device 110, to recommend corrective action or further investigation, and/or to suggest that a service technician be dispatched to investigate and/or address the likely problem(s) with the device 110.

In some embodiments, the central processing unit 125 may determine that the parameter(s) of power or energy of the device 110 measured by the monitor 105 provided to the central processing unit 125 are insufficient to allow the central processing unit 125 to accurately diagnose potential problem(s) with the device 110. In such embodiments, the central processing unit 125 may request that the monitor 105 obtain additional data from the device 110. The central processing unit 125 may communicate a request to the monitor 105 to take additional or different measurements of one or more parameter(s) of power or energy of the device 110. To gather the additional data requested by the central processing unit, the monitor 110 may alter its mode of operation. The monitor may alter its mode of operation by switching from operating according to one operating mode or framework 115, 120 to operating according to an alternate operating mode or framework 115, 120. In some embodiments, the monitor 110 may determine the alternate operating mode or framework 115, 120 to use to obtain the additional data requested by the central processing unit 125. In other embodiments, the central processing unit 125 instructs the monitor 110 regarding an alternate operating mode or framework 115, 120 to use to obtain the additional data requested by the central processing unit 125. In some embodiments, the alternate operating mode or framework 115, 120 is selected from operating modes or frameworks 115, 120 locally stored on the monitor 110. In other embodiments, the central processing unit 125 may communicate programming for implementing the alternate operating mode or framework 115, 120, which may be customized for a particular situation, to the monitor 110 when needed. In some embodiments, the alternate operating mode or framework 115, 120 may include a self diagnostic for the monitor 110.

The monitor 110 may utilize the alternate operating mode or framework 115, 120 to obtain the additional data requested by the central processing unit and may provide the additional data to the central processing unit 125. The central processing unit 125 may analyze the additional data, along with any previously obtained data, to attempt to ascertain potential problem(s) the device 110 may be experiencing. In some embodiments, the central processor may communicate with the operator 140 for the operator to make further assessments regarding the analysis performed by the central processor 125. If the central processor 125 determines that even additional data would facilitate determining potential problem(s) the device 110 may be experiencing or useful responses to such problem(s), the central processor 125 may request that the monitor 105 obtain even additional data from the device 110, in some embodiments by operating in accordance with an even further operating mode or framework 115, 120.

Once the central processor 125 has determined that it has sufficient data to analyze to determine potential problem(s) the device 110 may be experiencing and/or potential actions to take to resolve the potential problem(s), the central processor may instruct the monitor to return to operating in accordance with its original operating mode or framework 115, 120. Alternatively, the central processor 125 may request that the monitor 110 continue to operate in accordance with an alternate operating mode or framework 115, 120 until the potential problem(s) the device 110 may be experiencing have been investigated and/or resolved. Upon resolution of the potential problem(s), the central processor may instruct the monitor to return to operating in accordance with its original operating mode or framework 115, 120.

Upon determining the potential problem(s) the device 110 may be experiencing and/or potential actions to take to resolve the potential problem(s), the central processor may communicate an indication of the potential problem(s) the device 110 may be experiencing and/or potential actions to take automatically over communication line 160 or indirectly through a service call from the operator 140 as described above. In some embodiments, the central processor 125 may communicate a control signal to a monitor 110 or other system to automatically implement an action or actions to resolve the potential problem(s) the device 110 may be experiencing.

Subsequent to the potential problem(s) with the device 110 being investigated and/or addressed the central processor 125 may send requests for follow-up data regarding parameter(s) of power or energy of the device 110 to verify that the parameter(s) of power or energy of the device 110 are within a normal or expected operating range, indicating that the identified problems have been resolved.

In some embodiments, the central processor 125 may send periodic requests to monitor 110 to provide data regarding one or more parameter(s) of power or energy of the device 110. This data may be combined with data from other devices which may be monitored by the monitor 110 and/or from other monitors at a facility to generate an overall power or energy "health index" for the facility. The health index may be included in a report that is periodically provided to a representative of the facility. The report may highlight areas or equipment which the central processor 125 has determined may be operating marginally or which may benefit from inspection, adjustment, or repair.

In some embodiments, one or both of the monitor 110 and the central processing unit 125 of the system 100 may include a computerized control system. Various aspects may be implemented as specialized software executing in a general-purpose or specialized computer system 200 such as that shown in FIG. 2. The computer system 200 may include a processor 202 connected to one or more memory devices 204, such as a disk drive, solid state memory, or other device for storing data. Memory 204 is typically used for storing programs and data during operation of the computer system 200.

Components of computer system 200 may be coupled by an interconnection mechanism 206, which may include one or more busses (e.g., between components that are integrated within a same machine) and/or a network (e.g., between components that reside on separate discrete machines and/or between monitor 110 and central processing unit 125). The interconnection mechanism 206 enables communications (e.g., data, instructions) to be exchanged between system components of system 200. Computer system 200 includes one or more input devices 208, for example, a keyboard, mouse, trackball, microphone, or touch screen through which an operator may issue commands or programming to the system 200. Computer system 200 includes one or more output devices 210, for example, a printing device, display screen, and/or speaker. One or more sensors 214 may also provide input to the computer system 200. These sensors may include, for example, sensors which are capable of or configured to measure one or more parameters of power delivered to or consumed by device 110. In addition, computer system 200 may contain one or more interfaces (not shown) that connect computer system 200 to a communication network in addition or as an alternative to the interconnection mechanism 206. These interfaces may be utilized by the central processing unit to collect data 145, 150, and/or 155 and/or to communicate with the monitor 110. These interfaces may include a communication pathway for local warning or indication 130 and/or communication pathway 160.

Figure 3:
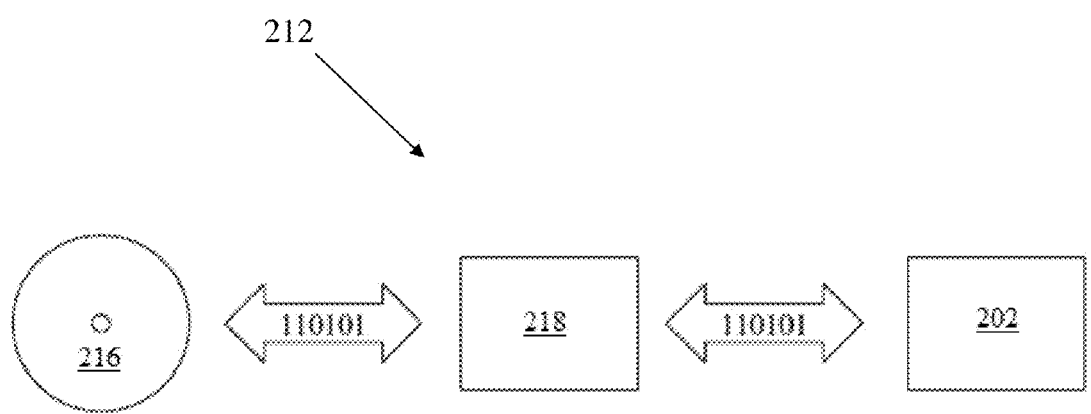
FIG. 3 is a schematic of a memory system of the computer of FIG. 2.

The storage system 212, shown in greater detail in FIG. 3, typically includes a computer readable and writeable nonvolatile recording medium 216 in which signals are stored that define a program to be executed by the processor or information to be processed by the program. The medium may include, for example, a disk or flash memory. Typically, in operation, the processor causes data to be read from the nonvolatile recording medium 216 into another memory 218 that allows for faster access to the information by the processor than does the medium 216. This memory 218 is typically a volatile, random access integrated circuit memory such as a dynamic random access memory (DRAM) or static memory (SRAM). It may be located in storage system 212, as shown, or in memory system 204. The processor 202 generally manipulates the data within the integrated circuit memory 218 and then copies the data to the medium 216 after processing is completed. A variety of mechanisms are known for managing data movement between the medium 216 and the integrated circuit memory element 218, and embodiments disclosed herein are not limited to any particular data movement mechanism. Embodiments disclosed herein are not limited to a particular memory system 204 or storage system 212.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Figure 2:
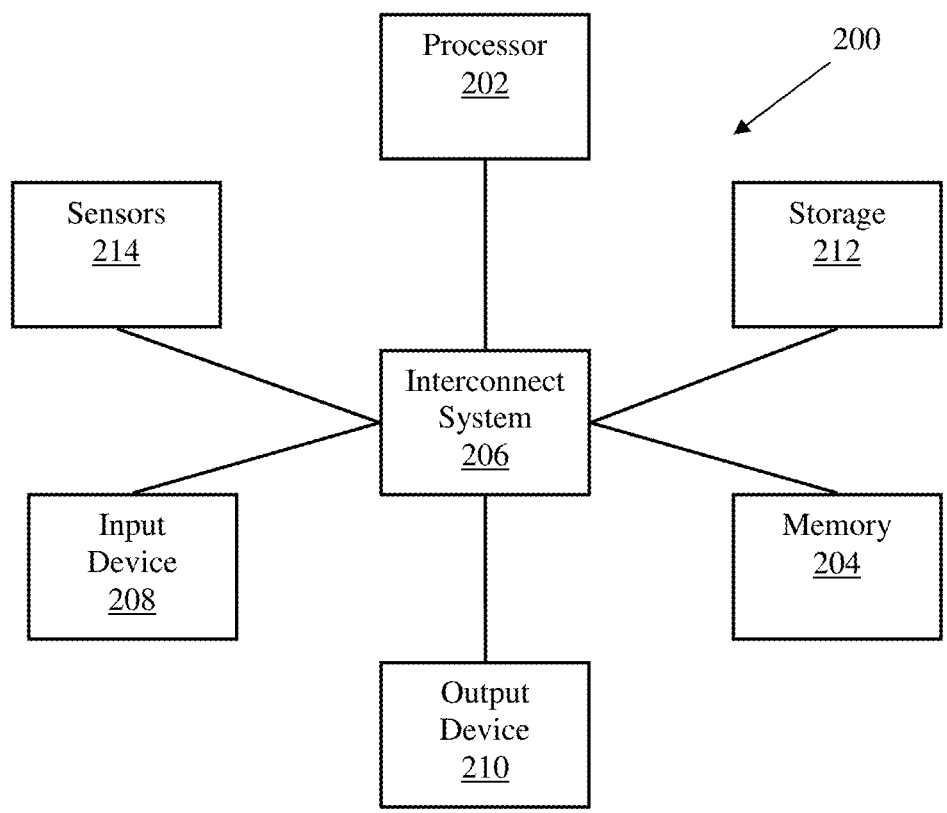
FIG. 2 is a schematic of a computer system included in embodiments of a system including an energy services recommendation engine.

Although computer system 200 is shown by way of example as one type of computer system upon which various embodiments disclosed herein may be practiced, it should be appreciated that the embodiments disclosed herein are not limited to being implemented on the computer system as shown in FIG. 2. Various embodiments disclosed herein may be practiced on one or more computers having a different architecture or components that that shown in FIG. 2.

Computer system 200 may be a general-purpose computer system that is programmable using a high-level computer programming language. Computer system 200 may be also implemented using specially programmed, special purpose hardware. In computer system 200, processor 202 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as Small-Talk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

Figure 4:
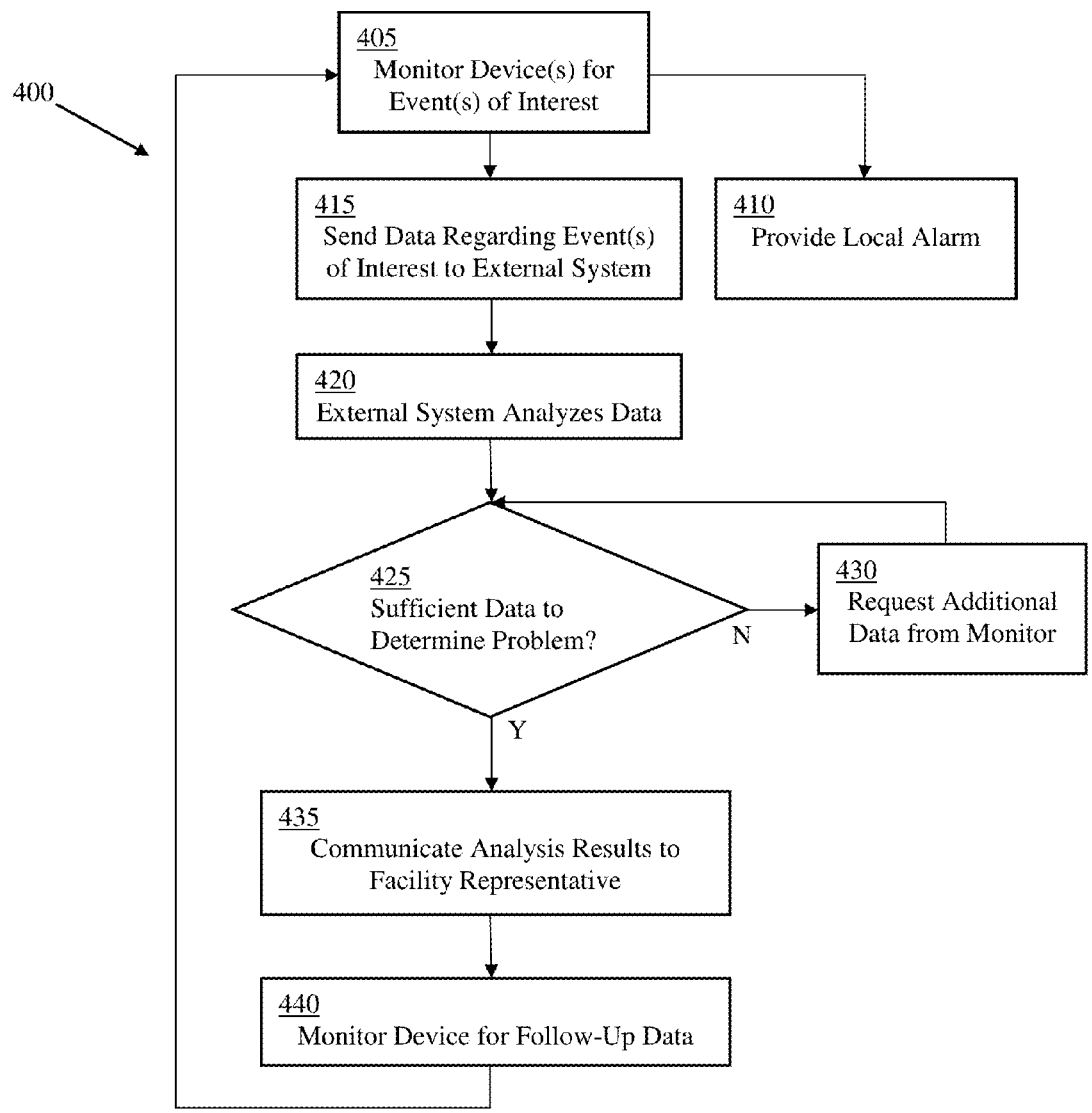
FIG. 4 is a flowchart of a method of implementing an energy services recommendation engine.

An embodiment of a method of implementing an energy services recommendation system is illustrated generally at 400 in FIG. 4. In act 405, a monitor, for example, monitor 110 monitors one or more devices or systems, for example, device 105 for the occurrence of an event of interest. The event of interest may be an event associated with power or energy provided to or produced by the device. The event of interest may be a parameter of power or energy associated with the device, for example, any one or more of voltage, current, fuel supply rate, power quality, timing, reflected power, power harmonics, or any other parameter of power or energy exhibiting a characteristic which the monitor determines is unexpected or unusual in some way. For example, the parameter of power or energy may exhibit a characteristic having a value which falls outside of a desired range or which violates one or more statistical process control rules established for the parameter.

The monitor may communicate a local alarm or warning to an operator or representative of a facility in which the monitor 110 and/or device 105 is located (act 410) and may additionally or alternatively communicate data regarding the event of interest to a separate computer system, for example, central processing unit 125 for analysis (act 415). In some embodiments, the monitor 110 may automatically take an action or initiate a routine to address a likely cause of the event of interest.

The separate computer system may be dedicated to the facility in which the monitor and/or device is located or may be shared between multiple facilities controlled or owned by one or more separate entities. For example, the separate computer system may be owned or operated by an energy services company while the device(s) and/or monitors which communicate with the separate computer system are located in individual residences, offices, factories, or other facilities owned or operated by an entity or entities other than the energy services company.

In some embodiments, the monitor communicates the data regarding the event of interest to the separate computer system responsive to occurrence of the event of interest. In other embodiments, the monitor may record the data, possibly along with other measurement data, in a log in a memory of the monitor or in an external memory device. A representative of the facility in which the monitor and/or device is located or a representative of the energy services company may periodically download the data from the log, for example, into a portable electronic device such as a portable computer or cell phone, and transfer the data to the separate computer system by either physically bringing the downloaded data to the separate computer system or transmitting the downloaded data from the portable electronic device to the separate computer system.

The separate computer system analyzes the data received from the monitor in act 420. The analysis of the data received from the monitor may include gathering additional data from alternate sources, for example, data 145, 150, and/or 155 to integrate with data received from the monitor to facilitate analysis of the data received from the monitor.

In act 425, the computer system determines if the data received from the monitor (in addition to any data received from alternate sources) is sufficient to make a sufficiently reliable determination of a possible cause or causes of the event of interest and to determine an appropriate response strategy to address the possible cause or causes. If the computer system determines that the data received from the monitor is not sufficient to make a sufficiently reliable analysis, it may send a request to the monitor to obtain and send additional data (act 430). The additional data may be obtained from the monitor by running the same monitoring operating mode that was used to obtain the data previously sent to the separate computer system. Additionally or alternatively, the computer system may request that the monitor alter its monitoring operating mode or apply a different monitoring operating mode to obtain the additional data. The altered or different monitoring operating mode may be one that is pre-programmed into the monitor or one that is sent to the monitor by the separate computer system. The altered or different monitoring operating mode may cause the monitor to collect data regarding a different parameter or parameters from the device, or additionally or alternatively from other devices or systems, alter a sampling rate and/or sampling duration for the previously monitored parameter, or otherwise cause the monitor to take different or additional measurements than were previously taken. In some embodiments the computer system may request the additional data from a monitor other than the monitor which previously provided the data regarding the event of interest to the computer system.

Responsive to receiving the additional data from the monitor, the computer system again checks if the data received from the monitor is sufficient to perform a reliable analysis of problems which the device may be exhibiting and/or to determine appropriate responses to these problems (act 425). If the data received from the monitor (in addition to any data received from alternate sources) is still insufficient for the computer system to perform a reliable analysis, the computer system may again request additional data from the monitor, possibly by running a further alternative monitoring operating mode (act 430). In some embodiments, if the monitor is incapable of providing the data that the separate computer system needs to perform a reliable analysis, the computer system may contact a representative of the facility at which the monitor and/or device is located, either automatically via a e-mail, text message or otherwise, or via a representative of the energy services company to request that additional data be taken locally at the facility at which the device is located, possibly with monitoring equipment that the separate computer system is unable to access or control by itself.

In some embodiments, a technician or operator of the energy services company may interact with the separate computer system to help analyze the data from the monitor to determine possible root causes for the event of interest and possible response plans and/or to implement a routine to address the possible root causes for the event of interest. The technician or operator may determine if the data received from the monitor is sufficient to provide a sufficiently reliable analysis and may instruct the separate computer system to request more or a different type data from the monitor if desired, possibly by instructing the monitor to perform a different monitoring operating mode than previously performed. The technician or operator may instruct the separate computer system to obtain additional data from alternate sources, for example, data 145, 150, and/or 155 to integrate with data received from the monitor to facilitate analysis of the data received from the monitor.

When the separate computer system has received sufficient data to perform a reliable analysis of the event of interest, the separate computer system may communicate its findings, which may include a list of possible problems with the device and/or one or more actions to take to resolve the problems with the device to a representative of the facility at which the device and/or monitor is located. In some instances, the separate computer system may determine that the data does not indicate that there is likely any problem with the device. In such instances, the separate computer system may communicate that the event of interest was a false alarm to the representative of the facility at which the device and/or monitor is located or may not initiate any communication regarding the event of interest. In some embodiments, the communication to the representative of the facility at which the device and/or monitor is located may be checked and approved by a representative of the energy services company prior to being sent. The computer system may contact the representative of the facility at which the monitor and/or device is located either automatically via a e-mail, text message or otherwise, or via a representative of the energy services company.

After action has been taken to address the problem(s) which the separate computer system determined were likely being experienced by the device, the separate computer system may request the monitor to communicate follow-up data regarding the device to the separate computer system (act 440). This follow-up data may be utilized by the separate computer system to verify that the problem(s) which may have caused the event of interest have indeed been resolved or if there is a likelihood of additional problems remaining. The follow-up data may be obtained by the routine or operating mode utilized by the monitor in act 405 or with an alternative operating mode selected by the separate computer system or by the monitor. If the separate computer system determines from the follow-up data that the device appears to be functioning in an acceptable manner the separate computer system may instruct the monitor to return to monitoring the device with its standard monitoring operating mode, e.g. the operating mode originally used in act 405. The method may then return to act 405.

Prophetic Examples:

HVAC System Current v. Time:

A monitor may be configured to measure and report electrical current drawn by an air conditioning system at a facility. Under periods of normal operation in the facility at a particular external temperature (or temperature range), the electrical current drawn by the air conditioning system exhibits the pattern over time illustrated in FIG. 5A as the compressor and fan of the air conditioning system periodically turn on and off to maintain the temperature in the facility at a desired level. The monitor provides data regarding the air conditioning system current draw to a computer system at an energy services company. The computer system analyzes the data and consults metadata regarding the facility to determine the hours and/or days of operation of the facility. The computer system determines that the air conditioning system runs even on days on which the facility is closed. The computer system sends a report to a representative of the facility recommending that the air condition system be turned down or off on days on which the facility is closed to save on energy costs.

Figure 5A:
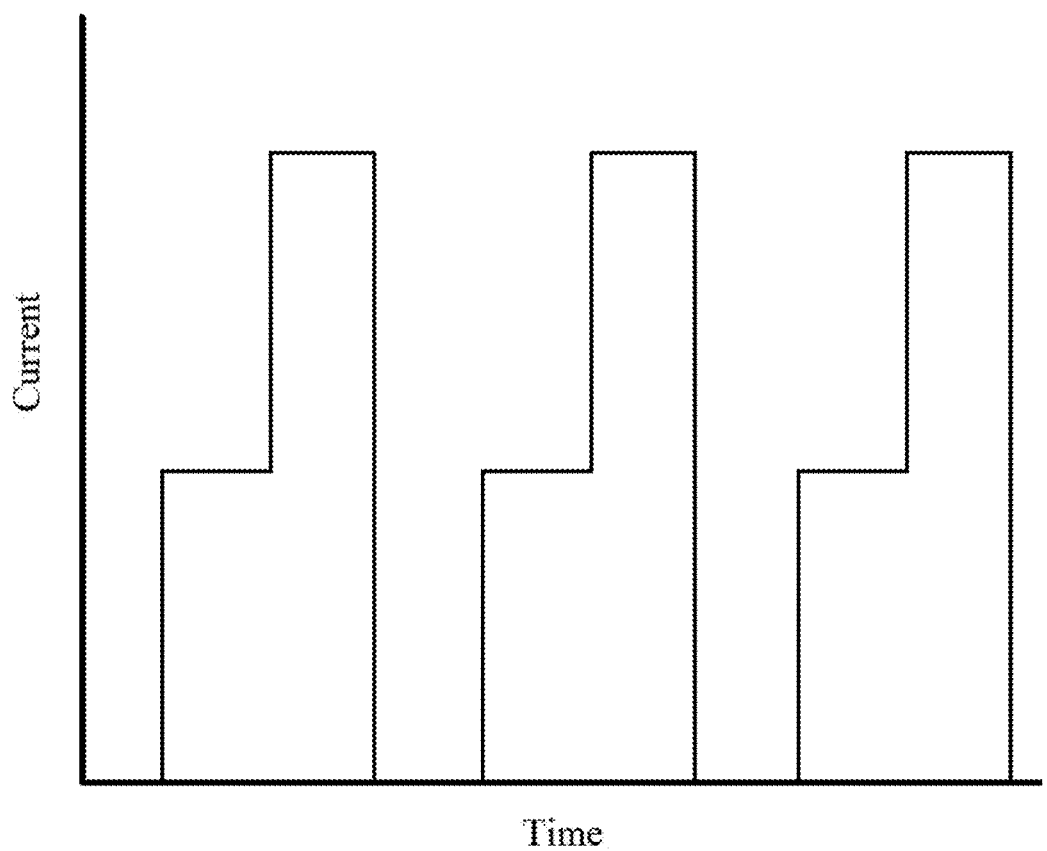
FIG. 5A is prophetic example of a current versus time profile of a device monitored by an embodiment of an energy services recommendation engine.
Figure 5B:
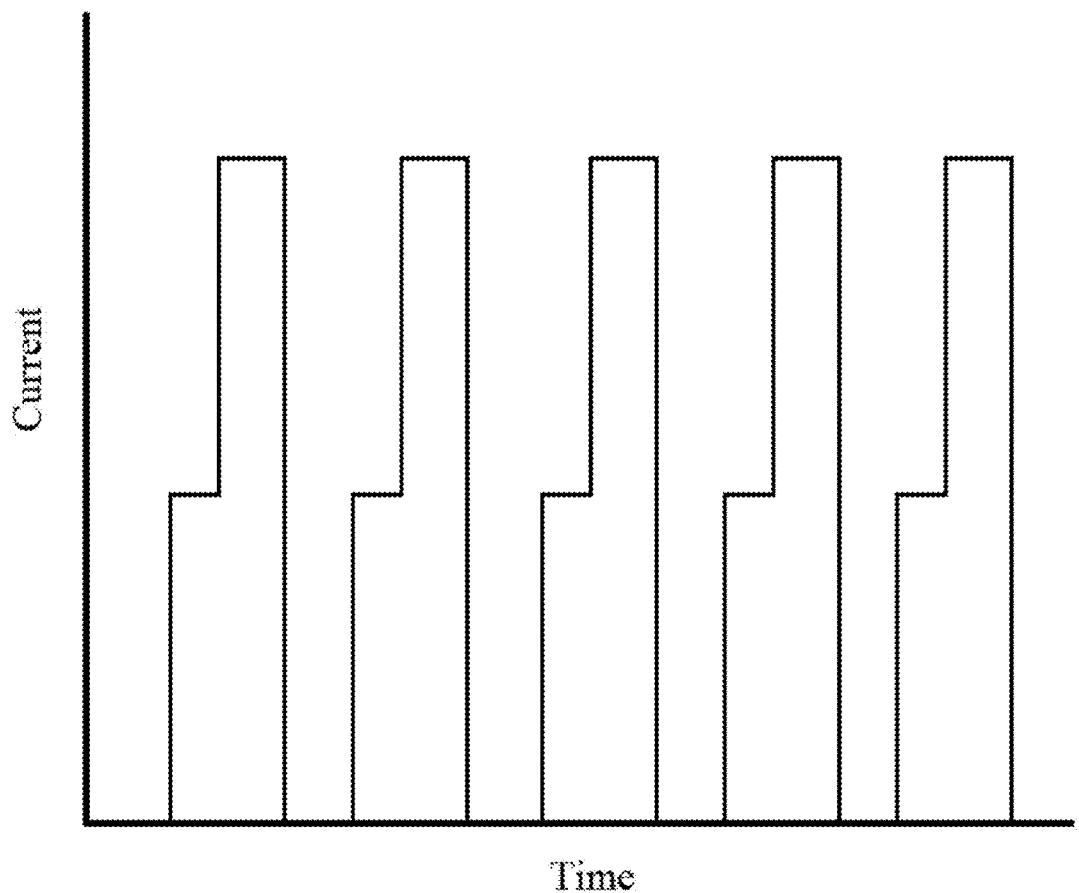
FIG. 5B is another prophetic example of a current versus time profile of a device monitored by an embodiment of an energy services recommendation engine.
Figure 5C:
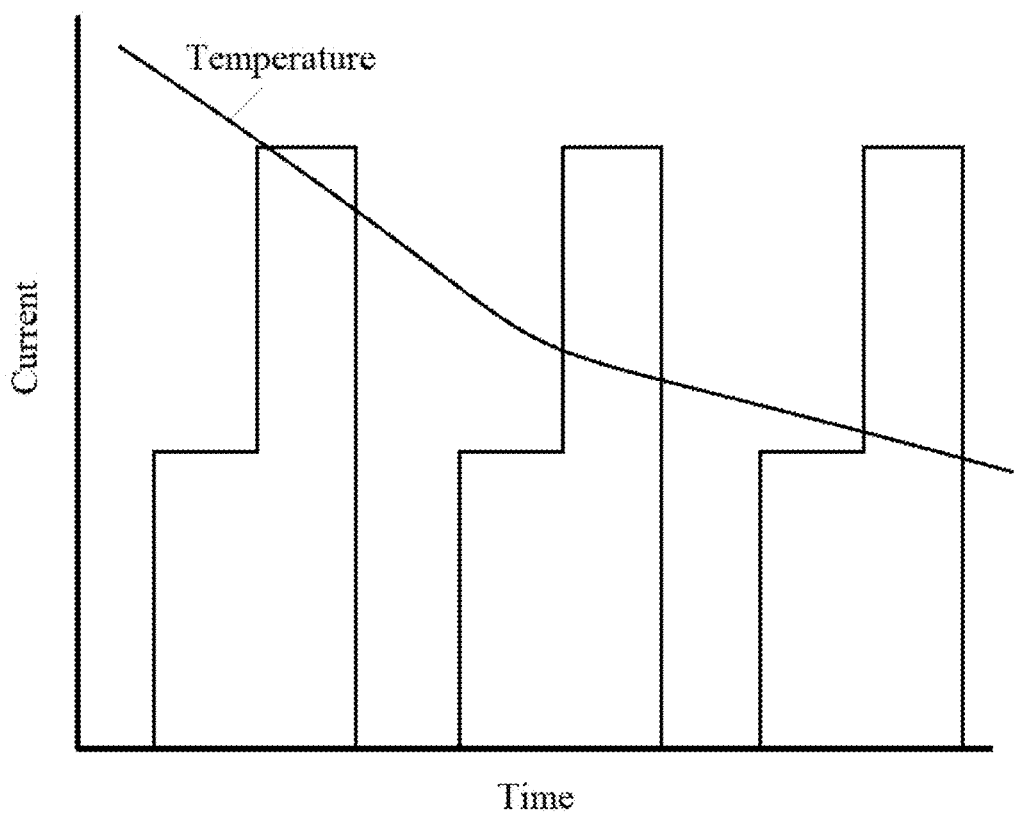
FIG. 5C is another prophetic example of a current versus time profile of a device monitored by an embodiment of an energy services recommendation engine.

Over time, the current v. time pattern for the air conditioning system may change from the normal pattern illustrated in FIG. 5A to the pattern illustrated in FIG. 5B in which the compressor and fan turn on and off at a greater frequency. The computer system may determine that the pattern illustrated in FIG. 5B is abnormal. In some embodiments, the computer system may send a control signal to shut down the air conditioning system until a cause of the abnormal pattern is determined and/or resolved. The computer system may request that the monitor read control settings of the air conditioning system, an operation that the monitor does not typically perform as part of regular operations, and send data regarding the settings to the computer system. The computer system may analyze the data regarding the settings to determine if a change to any of the settings may have been responsible for the abnormal current v. time pattern shown in FIG. 5B. The computer system may determine that there were no changes to the settings of the air conditioning system which would have been likely to have caused the change to the current v. time parameters of the air conditioning system. The computer system consults its database to match the pattern of FIG. 5B against similar patterns observed in the past from the air conditioning system or from similar air conditioning systems to determine what actions were previously taken to address the abnormal current v. time pattern. The computer system determines that abnormal patterns of current v. time similar to that shown in FIG. 5B were in the past caused by an air conditioning system being low on coolant. The computer system communicates this determination to a representative of the facility at which the air conditioning system is located and suggests checking the coolant level of the air conditioning system.

Over another period of time, data provided from the monitor to the computer system indicates that the air conditioning system maintains its normal current v. time profile even though metadata accessed by the computer system indicates that temperature in the location of the facility has dropped. The computer system determines that a drop in the amount of time the air conditioning system was operating should have coincided with the drop in temperature. The computer system communicates this determination to a representative of the facility at which the air conditioning system is located and suggests checking the settings and coolant level of the air conditioning system.

Coordinated HVAC System Operation:

Five HVAC units provide space heating/cooling for a small building, and each monitor assigned to an HVAC unit is configured to track daily energy consumption. If the average energy consumption over time suddenly increases or decreases by more than some threshold, the monitor sends captured daily consumption values to the central processing unit. One of the monitors detects the average daily energy consumption has increased by 50% and sends data to the central processing unit. Metadata for the site indicates that a total of five HVAC units are being monitored, and the central processing unit sends a program to all five monitors to capture hourly energy consumption data. The central processing unit receives hourly energy consumption data from all five monitors and models the total HVAC system energy consumption against outdoor temperature. The central processing unit determines that the total energy consumption does not exceed the bounds set by the model, and that there has been a slight decrease in energy consumption in two other HVAC units that started at the same time as the sudden increase in one HVAC unit. The central processing unit recommends following up with the building manager to determine if HVAC control or building use changed around the time of the detected increase in the one HVAC unit.

Lighting Operation:

A monitor is configured to track a lighting circuit in a building and stores daily metrics (such as energy consumption, average kW, etc). If the daily metric does not vary over time, this is a potential sign that lights are being left on all the time. The monitor sends the captured metrics to the central processing unit (along with metadata noting that the monitor is tracking a lighting circuit). The central processing unit sends a program to the monitor to temporarily watch for changes in instantaneous kW every second and log when changes larger than a predetermined amount occur. The central processing unit receives this new data from the monitor, and performs additional analysis, noting that (a) most changes indicate only a few light fixtures are being switched on and off at a time, and (b) these changes occur only during office hours. The central processing unit concludes that a large bank of common lighting is being left on all the time, and sends a recommendation for lighting controls to the customer. If lighting controls are installed, the monitor receives a new program that watches for evidence that the lighting controls are operating correctly, capturing the time that the common lighting switches on and off.

Boiler Operation:

A monitor is configured to track building gas usage and store daily metrics (such as volume of gas consumed). If the daily metric does not vary over time, this is a potential sign that a gas load is running constantly. The monitor sends captured metrics to the central processing unit (along with metadata noting that the main gas consumer in the building is a boiler for heating). The central processing unit sends a program to the monitor to temporarily capture gas consumption delta values every minute. The central processing unit receives this new data from the monitor, and performs additional analysis, noting that gas consumption is relatively constant over time even though outdoor temperature varies. The central processing unit concludes that the gas boiler is not properly being controlled, and recommends that the boiler operation be checked. If the customer provides feedback that the gas boiler operation has been corrected, the monitor receives a new program that captures gas consumption every 15 minutes and tracks daily consumption for expected variations.

Harmonics and Neutral Conductor Sizing:

A monitor is configured to track the average electrical currents in the main phases and neutral conductor of a three phase power line providing power to a motor in a facility and to store daily metrics (for example, mean/min/max currents in the main phases and neutral conductor). If the neutral conductor current exceeds a threshold ratio relative to the main phase currents, the monitor sends captured metrics to a central processing unit. The central processing unit sends a program to the monitor to capture a set of odd harmonics magnitudes (3rd, 5th, 7th, 9th, and 11th) for each current phase every hour, along with the average current on the neutral conductor every hour. The central processing unit receives this data and determines if the high neutral current may be due to the presence of triplen harmonics on the main phase conductors. The central processing unit determines that the neutral conductor may be sized too small to handle the current passing through it and sends a recommendation to troubleshoot the motor and/or install a larger neutral conductor of the motor.

Power Quality Analysis:

Monitors at a facility send data to a centralized computer system indicating that various devices at the facility are exhibiting losses of power. The centralized computer system accesses metadata associated with the facility to determine the location of the facility. The centralized computer system requests data from monitors at other facilities in a similar location as the first facility regarding power continuity for devices at the other facilities. The data indicates that some of the other facilities are also experiencing losses of power. The centralized computer system also accesses weather data for the location and determines that a thunderstorm is occurring at the location. The centralized computer system determines that the losses of power at the first facility are likely due to the thunderstorm and communicates this determination to a representative of the first facility.

Having thus described several aspects of at least one embodiment of this invention, it is to be appreciated various alterations, modifications, and improvements will readily occur to those skilled in the art. Any feature described in any embodiment may be included in or substituted for any feature of any other embodiment. Acts of methods disclosed herein may be performed in alternate orders, and one or more of the acts may be omitted or replaced by an alternative act. The methods disclosed herein may include additional acts not explicitly described. Such alterations, modifications, and improvements are intended to be part of this disclosure, and are intended to be within the scope of the invention. Accordingly, the foregoing description and drawings are by way of example only.

What is claimed is:

1. An energy service monitor and recommendation system comprising:
   one or more energy system monitoring devices in communication with an energy consuming device or system and configured to monitor parameters of power delivered to or consumed by the energy consuming device or system; and
   a central processing unit in communication with the energy system monitoring devices and configured to:
      receive data regarding the parameters of power from the energy system monitoring devices operating in accordance with a first mode of operation;
      determine if the central processing unit is capable of diagnosing potential problems with the energy consuming device or system based on the data regarding the parameters of power;
      in response to determining the data regarding the parameters of power is insufficient to allow the central processing unit to diagnose the potential problems with the energy consuming device or system, instruct the energy system monitoring devices to change from operating in accordance with the first mode of operation to operating in accordance with a second mode of operation in which the energy system monitoring devices are configured to collect data regarding a different parameter of power in addition to the data regarding the parameters of power when operating in accordance with the first mode of operation;
      receive additional data regarding the parameters of power from the energy system monitoring devices operating in accordance with the second mode of operation;
      analyze the data regarding the parameters of power and the additional data to determine if the energy consuming device or system is performing in accordance with a predetermined acceptable manner;
      in response to determining the energy consuming device or system is not performing in accordance with the predetermined acceptable manner, identify problems with the energy consuming device or system and determine actions to take to resolve the identified problems; and
      communicate instructions to the energy system monitoring devices to automatically implement the actions to resolve the problems with the energy consuming device or system,
   wherein the energy system monitoring devices are responsive to the instructions to automatically implement the actions to resolve the identified problems with the energy consuming device or system, and the energy system monitoring devices are responsive to instructions from the central processing unit to provide follow-up data regarding the parameters of power of the energy consuming device or system to obtain and provide the follow-up data to the central processing unit, and
   wherein the central processing unit is responsive to the follow-up data to determine if the parameters of power are within a normal or expected operating range, indicating that the identified problems have been resolved, and in response to determining the parameters of power are within the normal or expected operating range, the central processing unit instructs the energy system monitoring devices to return to operating in accordance with the first mode of operation.

2. The system of claim 1, wherein the central processing unit is further configured to receive metadata related to the energy consuming device or system and to analyze the metadata in addition to the data regarding the parameters of power to make the determination.

3. The system of claim 2, wherein the metadata includes an indication of a type of the energy consuming device or system.

4. The system of claim 2, wherein the metadata includes data regarding weather conditions at a location of the energy consuming device or system.

5. The system of claim 1, wherein the central processing unit is further configured to communicate the determination to a representative of a facility in which the energy consuming device or system is located.

6. The system of claim 1, wherein the central processing unit is further configured to communicate an indication of the actions to resolve the identified problems to a representative of a facility in which the energy consuming device or system is located.

7. The system of claim 1, further comprising a portable electronic device configured to download, at a facility in which the energy system monitoring devices are located, the data regarding the parameters of power delivered to the energy cnsuming device or system from a memory of the energy system monitoring devices and to transmit the data to the central processing unit.

8. The system of claim 1, wherein the central processing unit is further configured to communicate programming for implementing the second mode of operation to the energy system monitoring devices.

9. The system of claim 1, wherein the central processing unit is further configured to provide an indication to a representative of an energy service organization to place a service call to a representative of a facility in which the energy consuming device or system is located responsive to making a determination that the energy consuming device or system is not performing in accordance with the predefined acceptable manner.

10. A method for providing energy management services comprising:
monitoring a plurality of parameters of power delivered to or consumed by an energy consuming device or system using one or more energy system monitoring devices in communication with the energy consuming device or system;
receiving, at a centralized computer system, data regarding a first parameter of power of the plurality parameters of power from the energy system monitoring devices operating in accordance with a first monitoring mode;
determining if the centralized computer system is capable of diagnosing potential problems with the energy consuming device or system based on the data regarding the first parameter of power;
in response to determining that the data regarding the first parameter of power is insufficient to allow the centralized computer system to diagnose the potential problems with the energy consuming device or system, instructing the energy system monitoring devices to change from operating in accordance with the first monitoring mode to operating in accordance with a second monitoring mode in which the energy system monitoring devices are configured to collect data regarding a different parameter of power in addition to the data regarding the first parameter of power;
receiving, at the centralized computer system, data regarding the different parameter from the energy system energy system monitoring devices operating in accordance with the second monitoring mode;
analyzing the data regarding the first and different parameters of power to determine if the energy consuming device or system is performing in accordance with a predefined acceptable manner;
in response to determining the energy consuming device or system is not performing in accordance with a predefined acceptable manner, identifying problems with the energy consuming device or system and determine actions to take to resolve the identified problems; and
communicating instructions to the energy system monitoring devices to automatically implement the actions to resolve the identified problems with the energy consuming device or system,
wherein the energy system monitoring devices are responsive to the instructions to automatically implement the actions to resolve the identified problems with the energy consuming device or system, and the energy system monitoring devices are responsive to instructions from the central processing unit to provide follow-up data regarding the parameters of power of the energy consuming device or system to obtain and provide the follow-up data to the central processing unit, and
wherein the central processing unit is responsive to the follow-up data to determine if the parameters of power are within a normal or expected operating range, indicating that the identified problems have been resolved, and in response to determining the parameters of power are within the normal or expected operating range, the central processing unit instructs the energy system monitoring devices to return to operating in accordance with the first monitoring mode.

11. The method of claim 10, further comprising receiving, at the centralized computer system, metadata related to the energy consuming device or system and analyzing the metadata in addition to the data regarding the parameters of power to make the determination.

12. The method of claim 10, further comprising automatically communicating the determination to a representative of a facility in which the energy consuming device or system is located.

13. The method of claim 10, further comprising automatically communicating an indication of the actions to resolve the identified problems to a representative of a facility in which the energy consuming device or system is located.

14. The method of claim 10, further comprising downloading the data regarding the parameters of power delivered to the energy consuming device or system from a memory of the energy system monitoring devices with a portable electronic device and transmitting the data to the centralized computer system from the portable electronic device.

15. The method of claim 10, further comprising communicating programming for implementing the second monitoring mode to the energy system monitoring devices from the centralized computer system.

16. The system of claim 1, wherein the central processing unit includes a computerized control system, and the instructions communicated to the energy system monitoring devices to automatically implement the actions to resolve the identified problems with the energy consuming device or system are provided in the form of a control signal generated by the computerized control system.

17. The system of claim 1, wherein the energy consuming device or system is an electrical device or system, and wherein the parameters of power include at least one of voltage, current, power quality, electrical impedance of the energy consuming device or system or power supply wiring associated with the energy consuming device or system, reflected power, a phase of power delivered to or reflected from the energy consuming device or system, and power harmonics in power delivered to or reflected from the energy consuming device or system.

18. The system of claim 1, wherein the energy consuming device or system is a boiler, and wherein the parameters of power include a quantity, flow rate and/or temperature of fuel provided to the boiler.

19. The method of claim 10, further comprising:
sending periodic requests from the centralized computer system to the energy system monitoring devices to provide further data regarding the parameters of power of the energy consuming device or system; and
combining the further data with data from other devices monitored by the energy system monitoring devices to generate an overall power or energy health index for a facility in which the energy consuming device or system and the other devices are installed, the overall power or energy health index indicating areas or equipment the central computing system has determined are operating marginally or which may benefit from inspection, adjustment, or repair.

20. The method of claim 10, wherein automatically implementing the actions to resolve the identified problems with the energy consuming device or system includes adjusting one or more operating parameters of the energy consuming device or system.

21. An energy service monitor and recommendation system comprising:
one or more energy system monitoring devices in communication with an energy producing device or system and configured to monitor parameters of power produced by the energy producing device or system; and
a central processing unit in communication with the energy system monitoring devices and configured to:
receive data regarding the parameters of power from the energy system monitoring devices operating in accordance with a first mode of operation;
determine if the central processing unit is capable of diagnosing potential problems with the energy producing device or system based on the data regarding the parameters of power;
in response to determining the data regarding the parameters of power is insufficient to allow the central processing unit to diagnose the potential problems with the energy producing device or system, instruct the energy system monitoring devices to change from operating in accordance with the first mode of operation to operating in accordance with a second mode of operation in which the energy system monitoring devices are configured to collect data regarding a different parameter of power in addition to the data regarding the parameters of power;
receive additional data regarding the parameters of power from the energy system monitoring devices operating in accordance with the second mode of operation;
analyze the data regarding the parameters of power and the additional data to determine if the energy producing device or system is performing in accordance with a predetermined acceptable manner;
in response to determining the energy producing device or system is not performing in accordance with the predetermined acceptable manner, identify problems with the energy producing device or system and determine actions to take to resolve the identified problems; and
communicate instructions to the energy system monitoring devices to automatically implement the actions to resolve the identified problems with the energy producing device or system,
wherein the energy system monitoring devices are responsive to the instructions to automatically implement the actions to resolve the identified problems with the energy producing device or system, and the energy system monitoring devices are responsive to instructions from the central processing unit to provide follow-up data regarding the parameters of power of the energy producing device or system to obtain and provide the follow-up data to the central processing unit, and
wherein the central processing unit is responsive to the follow-up data to determine if the parameters of power are within a normal or expected operating range, indicating that the identified problems have been resolved, and in response to determining the parameters of power are within the normal or expected operating range, the central processing unit instructs the energy system monitoring devices to return to operating in accordance with the first mode of operation.

22. The system of claim 21, wherein the central processing unit includes a computerized control system, and the instructions communicated to the energy system monitoring devices to automatically implement the actions to resolve the identified problems with the energy producing device or system are provided in the form of a control signal generated by the computerized control system.

* * * * *